United States Patent Office 3,009,935
Patented Nov. 21, 1961

3,009,935
4,9(11)-PREGNADIEN-17α-ol-3,20-DIONE COMPOUNDS AND PROCESS THEREFOR
Frank A. Cutler, Metuchen, N.J., assignor to Merck & Co., Inc., Rahway, N.J., a corporation of New Jersey
No Drawing. Filed Oct. 29, 1954, Ser. No. 465,720
11 Claims. (Cl. 260—397.45)

This invention relates to steroids and particularly to 4,9(11)-pregnadien-17α-ol-3,20-dione and ketone derivatives thereof, to processes for preparing these compounds and to intermediate compounds formed by these processes.

The compound 4,9(11)-pregnadien-17α-ol-3,20-dione possesses anti-arthritic activity similar to cortisone and hydrocortisone. The ketone derivatives of 4,9(11)-pregnadien-17α-ol-3,20-dione as well as the compound itself are useful for producing other valuable steroids. As an example 4,9(11)-pregnadien-17α-ol-3,20-dione or the ketone derivatives thereof can be converted to 9α-fluoro-4-pregnene-11β,17α-diol-3,20-dione and 9α-fluoro-4-pregnene-11β,17α,21-triol-3,20-dione or their ketone derivatives by reacting with hypochlorous or hydrobromous acid at 0° C. in chloroform to form the corresponding 9α-halo-4-pregnene-11β,17α-diol-3,20-dione followed by reaction with potassium acetate in substantially anhydrous ethanol at reflux for two hours to form 9β,11β-oxido-4-pregnen-17α-ol-3,20-dione which is then reacted with hydrogen fluoride under anhydrous conditions at approximately 0° C. for about two hours to form 9α-fluoro-4-pregnene-11β,17α-diol-3,20-dione which has been found to possess cortisone-like activity. The 21-hydroxy group can be added to the molecule by a number of methods. The simplest of these methods is the fermentation of the compound with the species *Wojnowicia graminis* under aerobic conditions in a nutrient medium for a period of approximately 48 hours.

The compound 4,9(11)-pregnadien-17α-ol-3,20-dione is prepared by reacting 4,9(11)-pregnadiene-17α,21-diol-3,20-dione (compound I) with an organic sulfonyl chloride compound to form a 4,9(11)-pregnadiene-17α,21-diol-3,20-dione-21-sulfonate compound (compound II), reacting the sulfonate with an iodide salt to form the corresponding 21-iodo-pregnadiene compound (compound III) which is reduced to form 4,9(11)-pregnadien-17α-ol-3,20-dione (compound IV). The ketone derivatives (compounds V, VI, VII and VIII) are prepared by the reaction of the 4,9(11)-pregnadien-17α-ol-3,20-dione with a ketone reagent. These reactions may be chemically represented as follows wherein R is an alkyl group and Q is a nitrogenous ketone reagent radical.

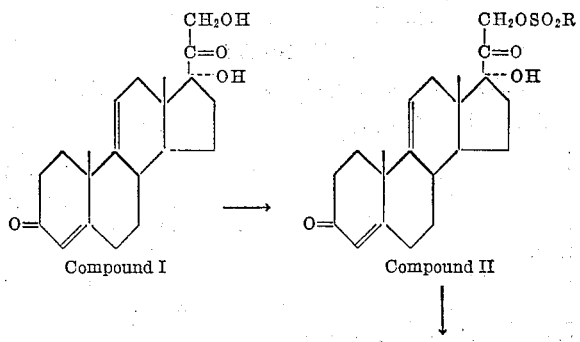

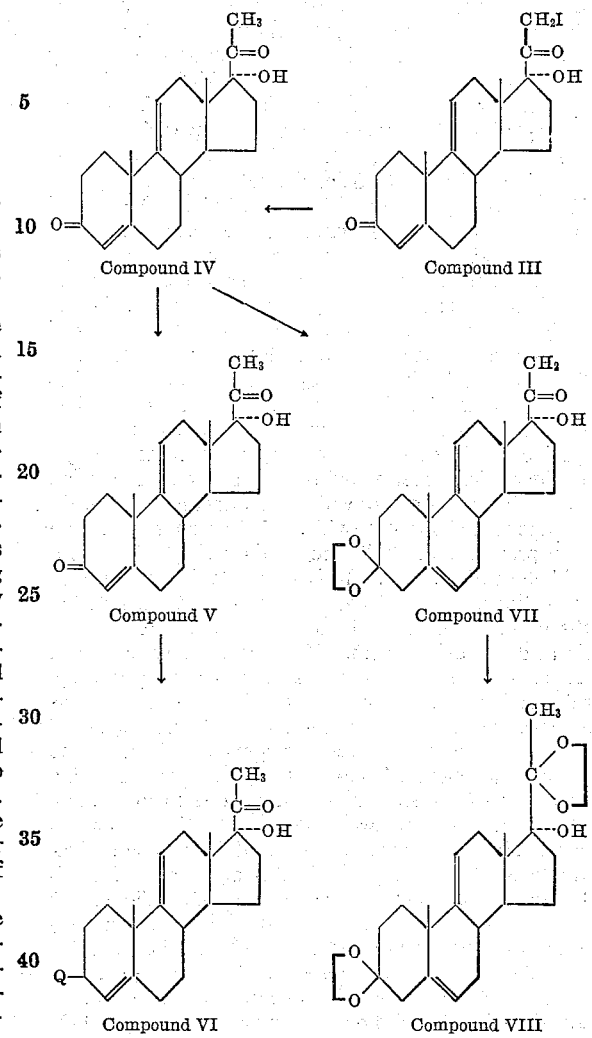

The 4,9(11)-pregnadiene-17α,21-diol-3,20-dione is reacted with an organic sulfonyl chloride compound to form a 4,9(11)-pregnadiene-17α,21-diol-3,20-dione 21-sulfonate compound. The sulfonyl chloride is of the formula $RSO_2Cl$ wherein R is an alkyl group preferably having a carbon chain length of from one to six carbon atoms. Typical examples of such groups are methyl, ethyl, propyl and butyl. The reaction is preferably carried out in a solvent such as pyridine or other tertiary amines. The reaction is usually complete in about one to three hours when the temperature is maintained at approximately 0° C. The product is recovered by diluting the reaction mixture with water and recovering the crystalline material.

The 4,9(11)-pregnadiene-17α,21-diol-3,20-dione 21-sulfonate is converted to the corresponding 21-iodo compound by treating with an iodide salt. Examples of typical iodide salts are alkali metal iodides such as sodium iodide and potassium iodide. The reaction is conveniently effected by contacting the reactants in a solvent such as an alcohol, ketone, or ether. Typical examples of suitable solvents are methanol, ethanol, propanol, methyl butyl ether, diethyl ether, acetone and methyl ethyl ketone. The reaction is preferably carried out at a temperature of approximately 25° C. to 100° C. and is usually complete in one-half to two hours. The product may be separated from the reaction mixture by the addition of a non-solvent such as water.

The 21-iodo-4,9(11)-pregnadien-17α-ol-3,20 - dione is reduced to produce 4,9(11)-pregnadien-17α-ol,3,20-dione. The reduction is preferably carried out by treating with zinc dust in acetic acid. Other reducing agents can be used however, such as magnesium in alcohol, hydrogen in the presence of a hydrogenation catalyst such as noble metal, and chromous chloride. The reaction is preferably carried out at a temperature of 20 to 40° C. and in this temperature range requires from one-half to four hours for completion. The product can be recovered by filtering, diluting the reaction mixture with water and filtering the precipitated product from the solution.

The 4,9(11)-pregnadien-17α-ol-3,20-dione is reacted with a ketone reagent to form the ketone derivative wherein one or both of the ketone groups are replaced. The ketone reagent is any of the reagents which will react with a keto group to form a group which can readily be hydrolyzed back to the keto group. Typical examples of classes of such reagents are hydroxylamines, semicarbazides, thiosemicarbazides, arylhydrazines, alkyl orthoformates, ethylenedioxy yielding compounds and the like. The most common of these reagents are semicarbazide, hydrazine, thiosemicarbazide, hydroxylamine, ethylphenylhydrazine, methylhydroxylamine, ethyleneglycol, and the ethylenedioxy derivatives of dimethyl ketone, diethyl ketone and mesityl oxide. The amount of ketone reagent present is controlled to produce either the mono- or di-ketone derivative. It is desirable in the case of ethylenedioxy yielding reagents to carry out the reaction in the presence of an acid catalyst such as p-toluenesulfonic acid or sulfuric acid. If desired, the reaction can be effected in an inert solvent, such as benzene, toluene, tetrahydrofuran, dioxane, dimethylformamide and dimethylacetamide. The reaction is conveniently achieved by intimately contacting the reactants and heating the mixture at an elevated temperature, such as the reflux temperature of the solvent, for about one to five hours. The product can be recovered by the addition of an immiscible solvent. Typical examples of the ketone derivatives which may be prepared in this manner are 3-semicarbazone of 4,9(11)-pregnadien-17α-ol-3,20-dione, 4,9(11)-pregnadien-17α-ol-3,20-dione disemicarbazone; 3,20-dioxime of 4,9(11)-pregnadien-17α-ol-3,20-dione; 3,20-bis-(2,4-dinitrophenylhydrazone) of 4,9(11)-pregnadien-17α-ol-3,20-dione; 3,20-dithiosemicarbazone of 4,9(11)-pregnadien-17α-ol-3,20-dione; 3-ethylenedioxy - 5,9(11)-pregnadien-17α-ol-20-one; and 3,20-diethylenedioxy-5,9-(11)-pregnadien-17α-ol. These compounds are particularly useful for preparing other steroids when it is deemed desirable to protect the 3 and 20 keto groups during subsequent reactions.

The following examples are given for purposes of illustration.

EXAMPLE 1

*4,9(11)-pregnadiene-17α,21-diol-3,20-dione-21-methanesulfonate*

A suspension of 0.2036 g. (0.592 millimole) of 4,9(11)-pregnadiene-17α,21-diol-3,20-dione in 2 ml. of dry pyridine was cooled in an ice bath. Methanesulfonyl chloride (0.07 ml., 0.924 millimole) was added and the mixture was stirred for twenty-five minutes in the ice bath while the solid dissolved and pyridine hydrochloride separated. The mixture was kept in the ice bath an additional sixty-five minutes and then water (13.5 ml.) was added slowly, giving a suspension of crystals. The suspension was chilled for four hours in ice, then filtered, and the product was washed three times with small portions of cold water. It was dried on the funnel in the air stream overnight. It weighed 0.2324 g. (93%). A sample heated from room temperature browned at about 175° C. and melted with decomposition at 187° C. A second sample placed in the bath preheated to 180° C. partially melted, resolidified, and melted at 189.5–191.5° C. (dec.).

EXAMPLE 2

*21-iodo-4,9(11)-pregnadien-17α-ol-3,20-dione*

To a solution of 0.2324 g. (0.55 millimole) of 4,9(11)-pregnadiene-17α,21-diol-3,20-dione 21-methanesulfonate in 10 ml. of acetone was added 0.19 g. (1.27 millimoles) of sodium iodide. The solution was refluxed fifteen minutes and sodium methanesulfonate precipitated. An additional 0.09 g. of sodium iodide was added and the mixture was refluxed further for fifteen minutes. Water (20 ml.) was then added slowly. The first portions dissolved the sodium methanesulfonate and gave a clear solution. Later portions gave turbidity, at which point addition of the water was halted until crystallization began. After the addition of all the water, the acetone was removed under reduced pressure. The resulting slurry was chilled fifteen minutes in the ice bath and then filtered. The product was washed three times with cold water and dried to constant weight on the funnel at room temperature in ninety minutes.

The compound weighed 0.2183 g. and decomposed at 142–149° C.

EXAMPLE 3

*4,9(11)-pregnadien-17α-ol-3,20-dione*

A sample of 21-iodo-4,9(11)-pregnadien-17α-ol-3,20-dione (0.2183 g.) was dissolved in 4.2 ml. of glacial acetic acid. To the stirred solution in a bath at 28–30° C. was added 0.2 g. of zinc dust over a ten minute period. The mixture was stirred further for fifty minutes in the ice bath and then filtered. The cake was washed with 1 ml. of glacial acetic acid and the combined filtrate was diluted slowly with 25 ml. of water giving a crystalline precipitate. The slurry was chilled for 100 minutes and filtered. The product was washed several times with cold water and dried on the funnel overnight; weight, 0.1602 g. (82% from I). The melting point varied somewhat with the rate of heating and extent of preheating. At seven degrees per minute from 205° C. it melted at 207–214.5° C.

EXAMPLE 4

*3,20-disemicarbazone of 4,9(11)-pregnadien-17α-ol-3,20-dione*

Eight grams of 4,9(11)-pregnadien-17α-ol-3,20-dione is suspended in a mixture of 268 ml. of methanol, 89.3 ml. of dimethylformamide, 8.6 ml. of water, 13.6 g. of semicarbazide hydrochloride and 7.4 g. of sodium bicarbonate. The stirred suspension is heated under reflux at about 70 to 71° C. for three and one-half hours at which time the temperature is reduced to 40–45° C. and held at this point for twenty-one hours. The solution is then cooled to room temperature, 358 cc. of water carefully added and the slurry filtered. The crystalline product is dried under vacuum to give substantially pure 4,9(11)-pregnadien-17α-ol-3,20-dione disemicarbazone.

EXAMPLE 5

*3,20-diethylenedioxy-5,9(11)-pregnadien-17α-ol*

A solution of 5 g. of 4,9(11)-pregnadien-17α-ol-3,20-dione, 10 ml. of the dioxolane of acetone and 0.1 g. of p-toluenesulfonic acid in 10 ml. of benzene is heated under reflux for three hours. The reaction mixture is cooled and poured into dilute sodium bicarbonate solution. The mixture is extracted with ether and the ether extract is washed with water, dried over magnesium sulfate and evaporated under reduced pressure to yield the 3,20-diethylenedioxy compound.

Any departure from the above description which conforms to the present invention is intended to be included within the scope of the claims.

What is claimed is:

1. A process which comprises reacting 4,9(11)-pregnadiene-17α, 21-diol-3,20-dione with an alkyl sulfonyl chloride compound, said alkyl group containing from 1 to 6 carbon atoms to form the corresponding 4,9(11)-pregnadiene-17α,21-diol-3,20-dione 21-sulfonate compound, reacting this latter compound with an alkali metal iodide salt to form the corresponding 21-iodo pregnadiene compound, reducing this compound to form 4,9(11)-pregnadien-17α-ol-3,20-dione and reacting the 4,9(11)-pregnadien-17α-ol-3,20-dione with a ketone reagent to form the corresponding ketone derivative.

2. A process which comprises reacting 4,9(11)-pregnadiene-17α,21-diol-3,20-dione with an alkyl sulfonyl chloride compound, said alkyl group containing from 1 to 6 carbon atoms to form the corresponding 4,9(11)-pregnadiene-17α,21-diol-3,20-dione 21-sulfonate compound.

3. A process which comprises reacting 4,9(11)-pregnadiene-17α,21-diol-3,20-dione 21-sulfonate with an alkali metal iodide salt to produce 21-iodo-4,9(11)-pregnadien-17α-ol-3,20-dione.

4. The process of claim 3 wherein the reaction is carried out in an organic solvent.

5. The process of claim 3 wherein the reaction is carried out at a temperature of approximately 25 to 100° C.

6. A process which comprises reacting 4,9(11)-pregnadiene-17α,21-diol-3,20-dione 21-methanesulfonate with sodium iodide to form the corresponding 21-iodo compound.

7. The process which comprises reacting 4,9(11)-pregnadiene-17α,21-diol-3,20-dione with a sulfonyl chloride compound having the formula $RSO_2Cl$ wherein R is an alkyl group having a carbon chain length of from one to six carbon atoms, to form the corresponding 4,9(11)-pregnadiene-17α,21-diol - 3,20 - dione 21-sulfonate compound, reacting this latter compound with an alkali metal iodide to form the corresponding 21-iodo-pregnadiene compound, and reducing this compound to form 4,9(11)-pregnadiene-17α-ol-3,20-dione.

8. The process of claim 7 where R is methyl.

9. The process of claim 7 wherein the solvent for the reaction involving the sulfonyl chloride compound is pyridine.

10. Δ4,9(11)-pregnadiene-17α,21 - diol - 3,20-dione 21-mesylate.

11. 21-iodo-Δ4,9(11)-pregnadiene-17α-ol-3,20-dione.

References Cited in the file of this patent

UNITED STATES PATENTS

| | | |
|---|---|---|
| 2,409,798 | Reichstein | Oct. 22, 1946 |
| 2,622,081 | Bernstein et al. | Dec. 16, 1952 |
| 2,640,838 | Wendler | June 2, 1953 |
| 2,707,190 | Farrar | Apr. 26, 1955 |
| 2,713,587 | Bergstrom | July 19, 1955 |
| 2,763,671 | Fried | Sept. 18, 1956 |
| 2,773,059 | Magerlein et al. | Dec. 4, 1956 |
| 2,905,678 | Sarett et al. | Sept. 22, 1959 |

FOREIGN PATENTS

| | | |
|---|---|---|
| 255,307 | Switzerland | 1949 |
| 573,786 | Great Britain | 1945 |
| 665,585 | Great Britain | 1952 |

OTHER REFERENCES

Fried: J. Amer. Chem. Soc., May 5, 1953, vol. 75, pages 2273–74.